Patented May 11, 1926.

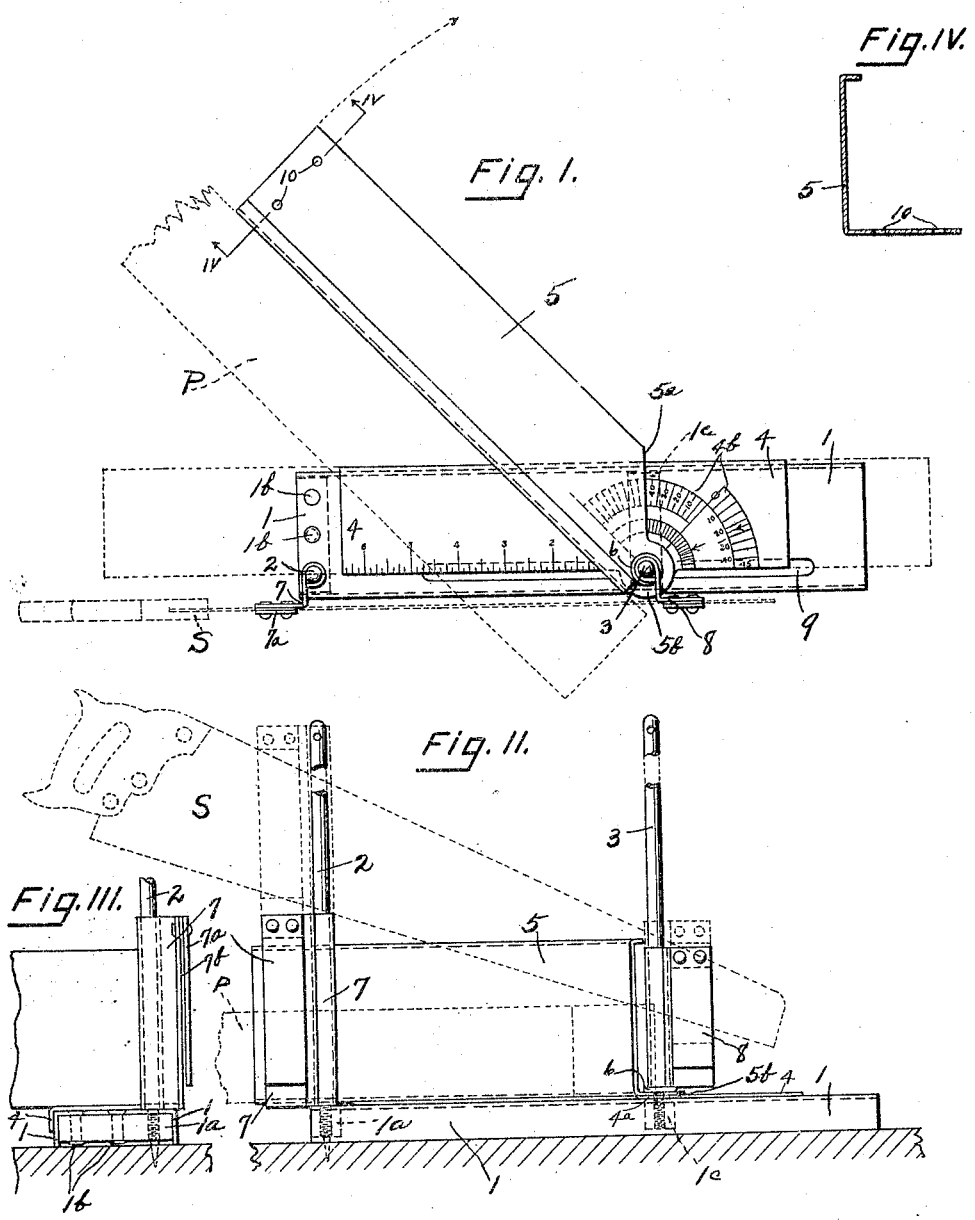

1,584,057

UNITED STATES PATENT OFFICE.

CHARLES E. WEST, OF PORTLAND, OREGON, ASSIGNOR TO THE HELMS COMPANY, OF PORTLAND, OREGON, A CORPORATION OF OREGON.

MITER BOX.

Application filed May 29, 1923. Serial No. 642,194.

My invention relates to miter boxes and more particularly to improvements in certain details thereof whereby to make the use of said miter box more convenient and efficient. In order to fully describe my improvements, I have shown on the accompanying drawings a miter box embodying my invention, which I will now describe.

Figure I is a top plan view of a miter box embodying my invention;

Figure II is a front elevation of the same;

Figure III is a fragmentary end view thereof with the saw out; and Figure IV is a cross sectional view taken on line IV—IV of Fig. I.

Referring in detail to the drawings, 1 designates a base, which may be made of a member of channel iron form, with a filler block or member 1ª, therein, as indicated in Fig. III. Two such blocks are shown, 1ª, at the end, secured in place by means of bolts or screws, as 1ᵇ, and a second one, 1ᶜ, which is adjustable lengthwise of the member 1. These blocks carry upright pins, as 2 and 3, which are screwed into the same through the member 1, the end of pin 2, being shown to be long enough to extend down into a bench or support, as indicated in dotted lines, Figs. II and III, whereby it can be struck down into a support to help to keep the box from slipping laterally. Mounted to slide on top of the member 1 is a graduated plate 4, having an extension at one side, as 4ª, through which the pin 3 passes, thus said plate 4 is slidably held in place by said pin 3. At the outer end of said slide plate is a protractor, 4ᵇ, clearly shown in Fig. I. Pivotally connected to said pin 3, over said slide plate and protractor, is an angle member, 5, shown in cross section in Fig. IV, having the beveled end, 5ª, to cooperate with the protractor in determining the position of the angle member, 5, for positioning the piece to be cut, indicated in dotted lines and designated P, Fig. I. The attached end of said angle member 5, is constructed with a round extension, 5ᵇ, through which the lower end of the pin 3 passes, with a washer, 6, above said extension, as indicated.

Slidably mounted on the pin 2, is a saw guide, 7, comprising an angle piece, as shown, with a spaced plate, 7ª, attached at its upper end and providing a saw receiving space, 7ᵇ. The saw is indicated in light dotted lines, as S. A similar saw guide, 8, is mounted on the pin 3, this one being shown slightly shorter than the saw guide 7, because it receives the small end of the saw. It will be observed that with this construction no special saw is required, as any ordinary hand saw can be used in the saw guides. These guides hold the saw away from the base plate 1, as will be clear from Fig. I. The saw guides are free to be raised up to the upper ends of the pins 2 and 3, with the saw, in order to permit the piece P, to be cut, to be placed in position under the saw, and against the back of the angle member 5, as clearly indicated. The pin 3, with the angle member 5, and the graduated slide plate 4, can be adjusted lengthwise of the base member 1, by reason of the slot, 9, in said base member 1, to permit pieces of different widths to be inserted between the pins 2 and 3, and against the back of the angle member 5. The angle of the cut to be made is determined by the adjusted position of the angle member 5 around the pin 3, relative to the protractor 4ᵇ. The outer end of the angle member 5 is provided with holes, as 10, through which nails can be driven for temporarily holding said member steady in its adjusted positions. The form of this member in cross section gives it strength and rigidity and also gives an effective piece to be gripped by the hand in holding the piece to be cut and said angle member together during the cutting operation.

While I have shown the preferred form of my invention, I am aware that changes can be made therein without departing from the spirit thereof, and I do not limit the invention except as I may be limited by the hereto appended claims.

I claim:

1. A miter box of the character shown and described comprising in combination a base member with longitudinal slot therein, a slide member thereon provided with protractor graduations, an angle member having a beveled end cooperating with said protractor, a pin connecting said angle member, said slide member and said base member together, through said slot, and holding said parts adjustably together, a second pin, and saw guide members slidably mounted on said pins and adapted to receive and guide a saw parallel with the said base member.

2. In a miter box of the character referred to, a base member of channel iron form, a wood filler member therein, a graduated slide plate adjustably mounted on said base member, an angle member pivotally connected to said base member over said slide member and adjustable thereon and therewith longitudinally of said base member, said angle member having its end beveled to cooperate with said graduated slide plate, and means pivotally and slidably connecting said angle plate and said slide plate to said base member.

3. In a miter box, in combination, a base member, a graduated slide plate, means slidably securing said plate on said base member, said plate being provided with protractor graduations, a member pivotally connected at one end to said base member and said slide plate and having a beveled end cooperating with said protractor graduations, and two saw guides adapted to receive and hold a saw along said base member and said slide plate.

4. In a miter box, in combination, a base member, a graduated slide plate, means slidably securing said plate on said base member, said plate being provided with protractor graduations, an angle member pivotally connected with said base member and said slide plate, two vertical pins, and two saw guides on said pins, substantially as indicated.

Signed at Portland, Multnomah County, Oregon, this 21st day of May, 1923.

CHARLES E. WEST.